United States Patent [19]

Mosiewicz

[11] Patent Number: 5,713,114
[45] Date of Patent: Feb. 3, 1998

[54] APPARATUS FOR SHAPING ELONGATED WORKPIECES

[75] Inventor: Robert Mosiewicz, Stresa, Italy

[73] Assignee: Cofimco S.P.A., Novara, Italy

[21] Appl. No.: 576,434

[22] Filed: Dec. 19, 1995

[30] Foreign Application Priority Data

Dec. 20, 1994 [IT] Italy ................... FI94A0230

[51] Int. Cl.⁶ ................ B23Q 5/22; B23C 3/12
[52] U.S. Cl. ................ 29/26 A; 29/33 Q; 409/138
[58] Field of Search .................. 29/26 A, 33 P,
29/33 Q, 564.7, 564.8, 56.5, 889.6, 889.7;
408/24, 25; 409/138, 132; 144/135.2, 35.1,
1.1, 144.41, 142

[56] References Cited

U.S. PATENT DOCUMENTS

| | | | |
|---|---|---|---|
| 3,002,264 | 10/1961 | Hollis et al. | 29/889.7 |
| 3,762,273 | 10/1973 | Sprung | 409/138 |
| 4,618,313 | 10/1986 | Mosiewicz | 416/237 |
| 4,946,021 | 8/1990 | Murphy | 29/33 P |
| 5,144,737 | 9/1992 | Riesmeier | 144/142 X |

FOREIGN PATENT DOCUMENTS

| | | | |
|---|---|---|---|
| 647828 | 9/1962 | Canada | 29/33 P |
| 140342 | 6/1986 | Japan | 29/889.7 |

Primary Examiner—William R. Briggs
Attorney, Agent, or Firm—Lowe, Price, LeBlanc & Becker

[57] ABSTRACT

Apparatus for the working of an elongated body, in particular a profile of a fan blade, comprising the following parts, linked to each other:

(a) a feeding device of a rod of an extruded material, from which the elongated body is obtained;
(b) a first blocking device of the rod;
(c) a second blocking device of the elongated body;
(d) a mobile trolley able to slide along sliding trails;
(e) a first cutting device integral with the mobile trolley;
(f) at least one drilling device;
(g) a second cutting device to cut the elongated body from the rod;
(h) and a shaping device integral with the mobile trolley.

6 Claims, 3 Drawing Sheets

APPARATUS FOR SHAPING ELONGATED WORKPIECES

FIELD OF THE INVENTION

The present invention relates to an apparatus for the working of an elongated body, in particular a profile of a fan blade. Further objects of the present invention are a cutting device for trimming the flap and a shaping device for shaping the profile end.

Since the apparatus, object of the present invention, allows to perform all main functions with only one apparatus, the advantages are evident. In fact, it involves a remarkable saving of working time with the following reduction of overall costs.

PRIOR ART AND SUMMARY OF THE INVENTION

The fan blades made of, e.g. an extruded material, are generally composed by a profile made of, e.g. aluminum, and by a blade connection linked to said profile, made of different materials with different shapes.

This kind of blade is described, for instance, in the U.S. Pat. No. 4,618,313 in the name of the same applicant. This patent also claims blades for an axial fan, for which a strain increase can be obtained by means of flaps having suitable dimensions and a certain inclination degree with regard to the profile chord.

The working of a profile is usually composed by the following steps:

(a) cutting of the profile at the desired length;

(b) drilling of the profile in order to allow the coupling with the blade connection;

(c) cutting of the profile external end along an arc;

(d) warping (when the profile is warped);

(e) trimming of the flap (when the non-warped profile is provided with a flap);

(f) further small operations.

Main object of the present invention is an apparatus which can perform the above-said operations, e.g. when non-warped profiles must be obtained, which however present on the external edge a flap to be longitudinally trimmed.

It is evident that if it is possible to perform all main operations with only one apparatus the advantages are remarkable. In fact, this involves a remarkable saving of working time with the following reduction of overall costs because each profile must not be displaced on several apparatuses in order to perform different operations. The bigger the profile, the more remarkable the saving. In fact, some profiles reach a weigth of 80 kg. Furthermore, the final product has a better quality due to the perfect repetitiveness of the profile placing and to the perfect setting of the apparatus.

Therefore, object of the present invention is an apparatus for the working of an elongated body, in particular a profile of a fan blade, comprising the following parts, linked to each other:

(a) a feeding device of a rod of an extruded material, from which the elongated body is obtained;

(b) a first blocking device of the rod;

(c) second blocking device of the elongated body;

(d) a mobile trolley able to slide along sliding trails;

(e) a first cutting device integral with the mobile trolley;

(f) at least one drilling device;

(g) a second cutting device to cut the elongated body from the rod;

(h) and a shaping device integral with the mobile trolley. Further object of the present invention is the shaping device.

LIST OF THE FIGURES

The invention will be better comprised referring to a particular non-limiting embodiment shown in the alleged figures.

DETAILED DESCRIPTION OF THE INVENTION

Figure 1:
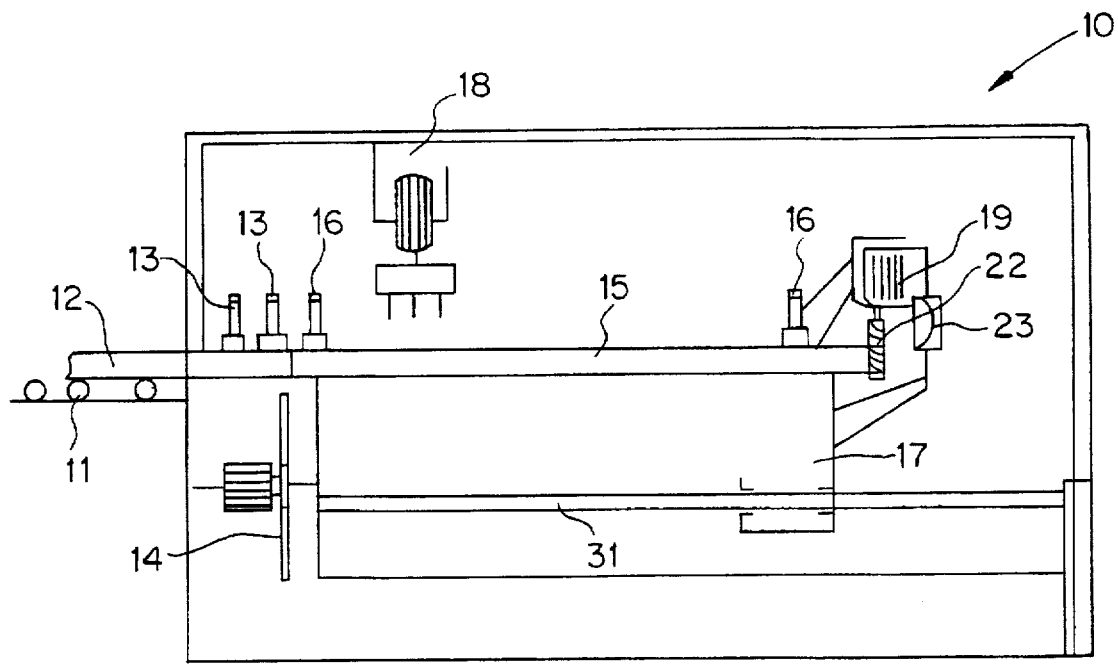
FIG. 1 shows a schematical side view of the apparatus object of the present invention.
Figure 2:
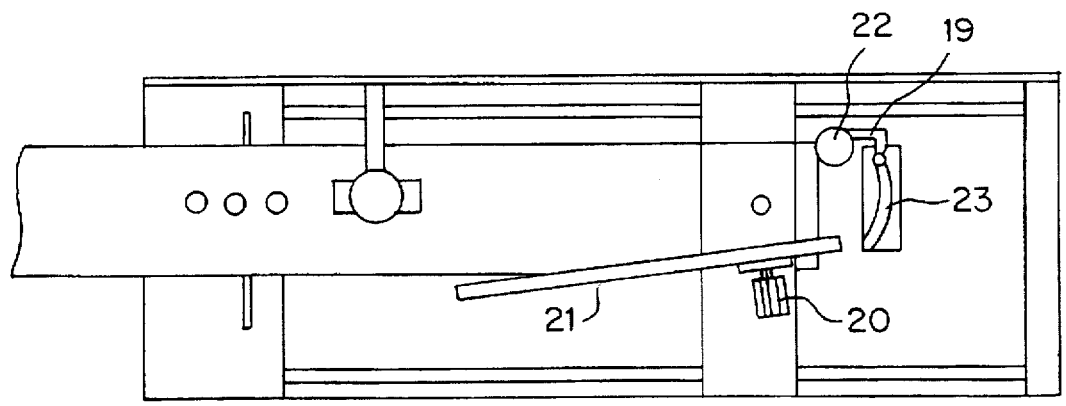
FIG. 2 is a top view of the apparatus of FIG. 1.

FIGS. 1 and 2 show the overall view of the apparatus 10 object of the present invention. Said apparatus 10 is composed by a frame supporting a feeding device 11 of a rod 12 from which the elongated body 15 is obtained. Therefore, a first blocking device 13 is provided which clasps pod 12, as well as a second blocking device 16 which clasps, in its turn, the elongated body 15, whereon the following operations are performed. With regard to said operations a drilling device 18 can be provided, which in its easiest form could be a simple drilling machine with one of more twist drills, which, when the elongated body 15 is a fan blade profile, serve to drill some holes in order to fix the profile to the blade connection. In FIG. 2 a first cutting device 20 is also present, which trims the profile flap by moving along the guide arm 21; to this regard please note that the movement of the first cutting device 20 (e.g., performed by means of a gear or by means of an air or hydraulic piston) is adjustable, because the guide arm 21 can shift and tilt. Said first cutting device 20 is integral with a mobile trolley 17 able to slide along sliding trails 31. The shifting of the mobile trolley 17 can vary according to the length of the elongated body 15. A shaping device 19 is also integral with the mobile trolley 17, said device being basically formed by a fluted mill 22 moved by the relevant electrical engine, guided by a template 23 whose drawing will be better described hereinafter, with reference to the FIGS. 3–10. The apparatus 10 is completed by a second cutting device 14, to cut the elongated body 15 from the rod 12.

The working of the apparatus 10, object of the present invention, is the following:

the extruded rod 12 is placed on the feeding device 11, e.g. a roller feeding device;

the extruded rod 12 longitudinally moves to the limit point (e.g. to the mobile trolley 17) suitably set according to the foreseen length of the elongated body 15;

the blocking devices 13, 16 fix the pod 12 and the elongated body 15 to the bed of the apparatus 10;

the drilling device 18 drills some holes on the elongated body 15;

the first cutting device 20 integral with the mobile trolley 17 trims the flap when the elongated body 15 is a profile of a fan blade;

the shaping device 19, also integral with the mobile trolley 17 shifting along the sliding trails 22, cuts the elongated body 15;

the second cutting device 14 cuts the elongated body 15 from the rod 12;

the second blocking device 16 releases the elongated body 15;

the elongated body 15, whose working is over, is removed from the apparatus 10.

It is evident that the lay-out of the aforesaid operations is illustrative because it is possible to control the sequence of the operations by means of, e.g. a suitable computer (not shown in the figure).

Figure 3:
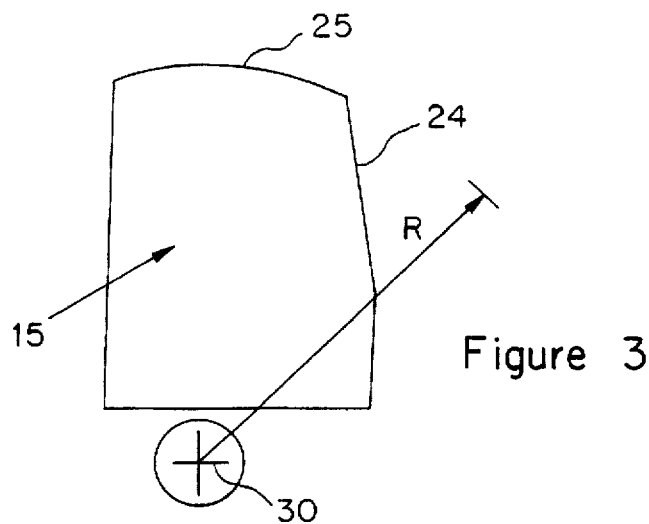
FIGS. 3–10 show the tracing operation of the profile.
Figure 4:
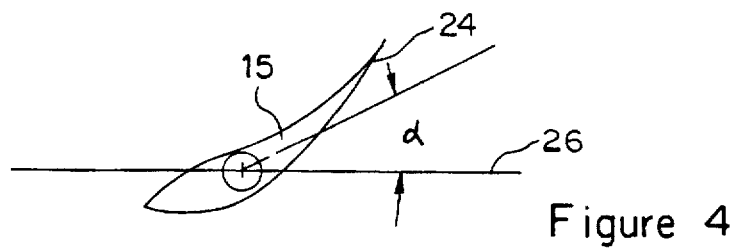
Figure 5:
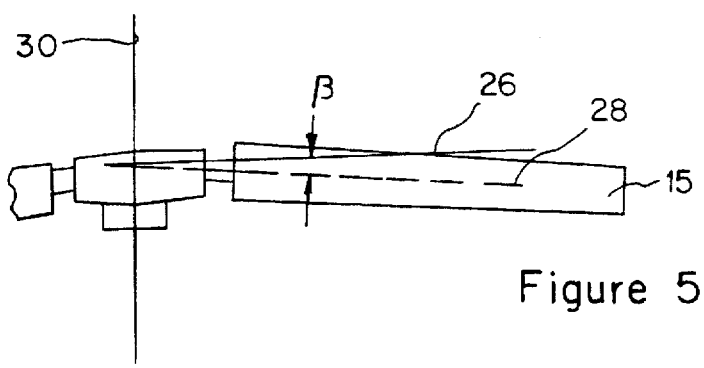
Figure 6:
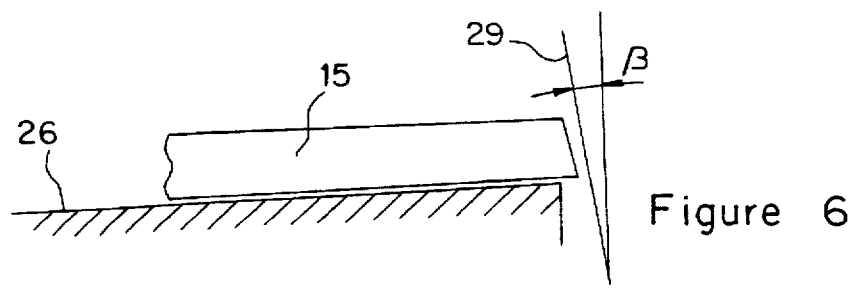

When the elongated body 15 is a profile of a fan blade FIGS. 3–4), two areas are detectable which have peculiar features: the flap 24, which, as already said, must be trimmed by means of the first cutting device 20, and a rounded portion 25 obtained by means of the shaping device 19. FIG. 4 shows that the profile 15 presents an angle of inclination α (setting angle) with respect to the horizontal plane 26 during the normal working of the fan. Said shaping device 19 comprises a fluted mill 22 guided by a pin 27 (FIG. 10) which can shift along a template 23 (FIG. 9) provided on a metal plate.

For a correct execution of said rounded portion 25 by means of the template 23, the following remarks are necessary. Since during the working the axis 28 (FIG. 5) of the profile 15 is tilted with a β angle with respect to the perpendicular 26 to the central axis 30 of the fan, and since the profile 15 must be placed as per FIG. 6 for the cutting operation of the portion to be rounded, it is therefore necessary that axis 29 of the fluted mill 22 is inclined with the same β angle. The β angle can vary according to the kind of blade.

Figure 7:
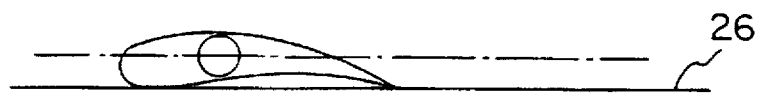
Figure 8:
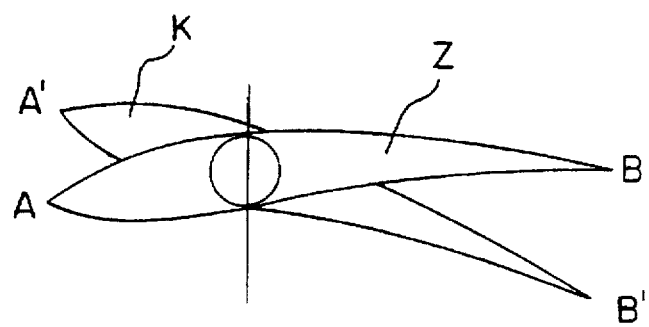
Figure 9:
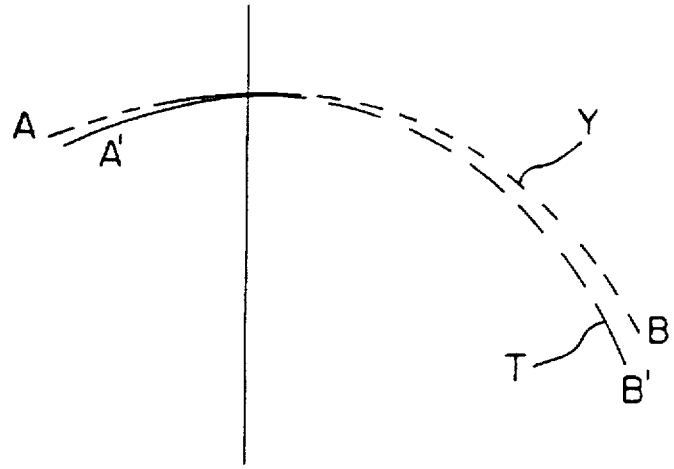

Furthermore, the end of the profile 15, in a top view projection, must be an arc (FIG. 3) having a ray R with respect to the central axis of fan 30. During the cutting operation of the rounded portion 25, the profile 15 is placed with respect to the apparatus level 26 with a setting angle α=0° (FIG. 7). If, for example, the a setting angle of the profile 15 during the working is 20° (FIG. 8), the end of said profile 15 (placed at 0° on the apparatus) must be cut according to a curve so that it becomes an arc in top view if the profile 15 is brought from 0° to 20°. Therefore, if X (FIG. 8) indicates the position of the profile 15 during the working and Z indicates the position of the profile 15 during the cutting of the rounded portion 25, the points A and B belonging to the cutting curve Y (which is not an arc; FIG. 9) must rotate of 20° in order to correspond to points A' and B'. It is evident that the aforesaid remarks are valid for any value of the inclination angle, also if it is different from 20°.

Figure 10:
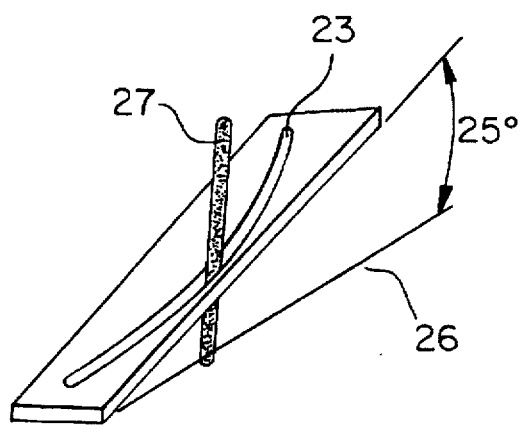

In FIG. 10 the template 23, which guides pin 27 of the fluted mill 22, is an arc with a ray R when the plate rotates of 25° with respect to the horizontal plane and it is projected in top view (FIG. 10). In other words, this means that the cutting of the profile is an arc only when the profile is inclined of 0° and the plate of 25°. In order to obtain a cutting which is an arc with any setting angle, e.g. α=20°, template 23 must rotate with a τ=25°−α angle, in this case 25°−20°=5°. The pin 27, guiding the fluted mill 22, which always cuts vertically, produces a cutting on the profile 15 placed on the apparatus with a setting angle α=0°; FIG. 7) which is not an arc. This curve becomes, however, an arc by setting the profile at the working angle (for instance, 20°) and projecting it in top view. In the case shown in FIG. 10 it is used a maximum working angle of 25°, since the usual maximum working angle of the blades is 25°. Therefore, in the extreme condition (working at 25°) the plate has an inclination of 25°−25°=0° (horizontal plate).

It would be understood that numerous modifications may be made in the specific form of the invention shown in the drawings and described above without deviating from the scope of the invention.

I claim:

1. An apparatus for the forming of an elongated body comprising to each other
   (a) a feeding device for feeding a rod of an extruded material, from which the elongated body is obtained;
   (b) a first blocking device for clamping the rod;
   (c) a second blocking device for clamping the elongated body;
   (d) a mobile trolley slidable along sliding rails;
   (e) first cutting device carried by the mobile trolley;
   (f) at least one drilling device;
   (g) a second cutting device to cut the elongated body from the rod; and
   (h) a shaping device carried by the mobile trolley.

2. Apparatus according to claim 1, wherein said elongated body is a profile of a fan blade.

3. Apparatus according to claim 1, wherein said first cutting device is capable of trimming a flap of a profile of a fan blade by moving along a guide arm during the cutting movement.

4. Apparatus according to claim 1, wherein said shaping device comprises a fluted mill and a template which guides a pin to guide said fluted mill.

5. Apparatus according to claim 4, wherein said template is inclined with respect to the horizontal plane and is drawn so that said fluted mill cuts the end of said profile along a curve which is an arc when it is horizontally projected with the blade inclined towards the working angle.

6. Apparatus according to claim 1, wherein all the operations performed by said devices are controlled by means of a suitable computer.

* * * * *